United States Patent Office 3,481,862
Patented Dec. 2, 1969

3,481,862
CS₂ SULFIDING OF CATALYSTS
Joseph R. Davis, Jr., Wallingford, Pa., and John D. Tice, Wilmington, Del., assignors to Sun Oil Company, Philadelphia, Pa., a corporation of New Jersey
No Drawing. Filed Oct. 30, 1967, Ser. No. 679,215
Int. Cl. C10g 23/02
U.S. Cl. 208—143          10 Claims

ABSTRACT OF THE DISCLOSURE

Sulfiding process for sulfactive hydrogenation catalysts of Groups VI and VIII of the periodic table by passing carbon disulfide dissolved in a carrier oil and hydrogen over the catalyst stock at a temperature of 350° to 550° F. under a pressure of at least 500 p.s.i.g., without a gas bleed in the system which is maintained at a pressure of at least about 500 p.s.i.g. and adding only enough hydrogen to maintain pressure in said high pressure system.

---

The invention relates to the preparation of an improved metal sulfide catalyst used in hydrogenation refining of petroleum fractions. More particularly, this invention relates to a method of preparing a nickel-molybdenum sulfide catalyst having significantly greater power to reduce the ultra-violet absorptivity of petroleum fractions treated therewith.

BACKGROUND OF THE INVENTION

As those in the chemical arts well know, the predictability and even explanation of a certain catalytic activity or better the catalytic effect confounds the most highly skilled artisans. Catalysis is known to be very complex and among the most difficult areas of the general science of chemistry. This characteristic holds especially true for the well-known metal sulfide catalysts employed in hydrogenation refining of petroleum fractions. The preparation of catalysts that are nominally active is well known but little is known about why a catalyst has a particular activity and even less so how the activity can be enhanced. The great difficulty is caused in part by the magnified complexities of the plural function of such catalysts. The discovery of any worthwhile improvement in catalytic effect in such technology is accordingly to be highly commended.

According to prior art techniques the sulfiding may be done with any sulfur containing compounds which forms H₂S in the presence of hydrogen under the conditions employed. Typically, the sulfiding is done in gaseous or vapor phase and usually with H₂S (since that generally produces a slightly superior catalyst) and hydrogen. When the reaction is so carried out a gas bleed downstream of the catalyst bed must be taken in order to provide for a gas flow through the system. Sometimes the catalyst is sulfided in liquid phase by addition of the sulfiding agent to a petroleum fraction and passing same over the catalyst with hydrogen. Perhaps because of the experience with the vapor phase sulfiding techniques a gas bleed is also taken, for example at the high pressure separator in a liquid phase sulfiding technique. Whatever the reason, so far as we are aware, a gas bleed has always been taken even in the liquid phase technique. The effect of eliminating the bleed on the catalyst activity is entirely unpredictable. One could speculate that there should be an increase in sulfur take-up under such conditions. This, however, is not at all certain in contrast to the predictable result of a slightly faster sulfiding rate; but, assuming arguendo that could be an expected result, there still is no predictable effect it would have on the catalyst activity. Work by ourselves and co-workers establishes that catalyst activity does not necessarily correlate with sulfur take-up by the catalyst. Still further it is entirely unpredictable which if any of the plural functions of the catalyst would be effected and in what direction.

SUMMARY OF THE INVENTION

We have therefore found, quite unexpectedly and for reasons not fully understood, that when a sulfactive metal catalyst stock is sulfided with carbon disulfide and hydrogen under the proper combination of conditions, and particularly wherein a hydrogen bleed is eliminated during the sulfiding, the catalyst has a markedly higher power to reduce the ultraviolet absorptivity of the petroleum fraction hydrogenatively refined therewith and without significant, if any, adverse effects on the other properties of the oil so treated. Catalysts so produced are substantially equivalent to those produced with H₂S as such as the sulfiding agent. In more detail this inventive process comprises sulfiding a nickel oxide-molybdenum oxide combination catalyst in liquid phase with a small amount of carbon disulfide dissolved in a carrier oil at a liquid hourly space rate of about 0.25 to 6, and with make-up H₂ gas sufficient only to maintain pressure, more usually in the range of about 500 to 1500 p.s.i.g., at a temperature in the range of about 350° F. to 550° F., said process being further characterized as being without a gas bleed in the system. A particularly advantageous embodiment of this invention being wherein said catalyst so prepared is employed to hydrogenate a naphthenic lube oil at a temperature in the range of about 575° F. to 625° F. and a pressure of about 500 to 4000 p.i.s.g. at a liquid hourly space rate in the range of about 0.1 to 5.0 and wherein liquid recycle is employed in said hydrogenation process, whereby enhanced reduced U.V. absorptivity of said naphthenic lube oil is obtained.

DETAILED DESCRIPTION

Catalysts which can be prepared by this process are broadly any of the sulfactive hydrogenation catalyst. These are well known in the art and are members of Groups VI and VIII of the periodic table. Examples are tungsten, chromium, molybdenum, cobalt, iron, nickel, platinum, etc. sulfides or mixtures of such metal sulfides. Generally, the oxide forms of the metals are sulfided rather than the free metal. Any of the well-known catalyst carriers may be employed as such carriers, as activated carbon, alumina, bauxite, charcoal, clay, kieselguhr, magnesia, pumice, silica, silica-alumina compositions, etc. The preferred catalyst are combinations of nickel-molybdenum and cobalt-molybdenum and especially those defined in British Patent 1,024,317 published Mar. 30, 1966. The nickel-molybdenum oxides so prepared are the preferred catalyst material. These are commercially available containing about 3% of nickel oxide and about 10% to 15% molybdenum oxide.

As to the time required for sulfiding, that normally requires several hours. Typically using about 1% by volume of CS₂ in the oil fraction carrier about 36 hours is required to fully sulfide a catalyst. We have obtained good results on charging a minimum of about 0.32 lb. CS₂/lb. of catalyst although lesser amounts can suffice in some cases and greater amounts may be required in other cases. Those skilled in the art will have little difficulty knowing when the sulfiding is complete in any event.

The temperature during sulfiding should be kept in the range of about 350° to 550° F. Although the temperature can exceed the upper limit for a brief period without rendering the catalyst completely inactive, it should be brought back down within the specified range as soon as possible to minimize adverse effects. Preferably the temperature is kept in the more restricted range of 400° F. to 475° F.

The relative amount of carbon disulfide employed generally will be in the range of about 0.2 to 2.0 volume percent based on the petroleum fraction oil carrier. Preferably, however, about 0.5% to 1.0% by volume of $CS_2$ is employed. Such concentrations provide a substantially optimum balance of desiderata between maximum sulfiding rate without excessive heat generation from the exothermic heat of sulfiding; the oil carrier operating as a good heat sink to avoid excess temperatures.

Normally, the reactor is loaded with catalyst material, then the reactor is pressured with hydrogen, to design or operating pressures of about 500 to 1500 p.s.i.g. (higher pressures can be employed, the limit being determined by design limitations of the equipment since in theory it is without limit), preferably about 800 to 1200 p.s.i.g., and the oil carrier, which is usually the feed to be ultimately hydrogenated, preheated to about 350° to 400° F. is charged to the reactor and thereby the catalyst to be sulfided is heated to a temperature of about 325° to 350° F. Relatively mild temperatures within the broad range indicated hereinabove, however, are to be employed in order to avoid reducing the oxide catalyst stock to the free metal by the hydrogen. The carbon disulfide is then added to the carrier oil to achieve the desired concentration and the carrier oil and carbon disulfide mix is charged to provide for a liquid hourly space rate of same of from about 0.25 to 6 but preferably about 0.5 to 3.0. Generally the carrier oil employed is the ultimate feed to be charged to the unit for hydrogenation thereof, however, in the case of the more viscous charge stocks a suitable lower viscosity stock is preferably employed as a diluent in the sulfiding operation. Alternatively a carrier oil different from the contemplated hydrogenation feed may be employed alone during the sulfiding operation and the carrier oil is then displaced by the regular feed when sulfiding is complete. Illustrative examples of suitable diluents and suitable carrier oils are naphthas and low viscosity lube oils. Usually, however, where a lower viscosity is desired the lower viscosity material is used alone because it is a simpler operation.

To facilitate the understanding of the invention, certain details and illustrative embodiments will now be set forth; however, of course, it is to be fully understood and appreciated that the invention is not limited to the specific conditions or details set forth in these examples, except as they are found in the appended claims, since the process is capable of many modifications and variations in conditions, such modifications and variations being aided, suggested, or indicated by the discussion of the process as found herein and the discussions of the trend of the effect of the various factors.

EXAMPLES

In a series of comparative sulfiding runs a commercial granular nickel oxide-molybdenum oxide catalyst sold by the American Cyanamid Company under the designation of Aero HDS-3A was loaded into a small scale reactor (i.e., about 30 inches long and about 1½ inches in diameter). The reactor was then pressured with a hydrogen stream, the pressure and hydrogen stream being further identified hereinafter in the table. A naphthenic lube oil of about 100 S.U.S. at 100° F. in each instance was heated to about 350° F. and passed through the catalyst bed at liquid hourly space velocity of about 0.5 to heat same to about 350° F. When the catalyst bed reached about 350° F. carbon disulfide in an amount of about 1 volume percent, based on the lube oil charge, was then added to the charge stream and the temperature of the bed was increased to about 450° F. The sulfiding with the carbon disulfide dissolved in the lube oil was continued for about 36 hours with sufficient hydrogen addition to maintain the desired pressure including the cases where a gas bleed was taken as indicated in the table. In order to avoid the possibility of obtaining a false activity rating of the new sulfided catalyst a breakin hydrogenation run of about 24 hours duration was carried out using the 100 S.U.S. naphthenic lube oil at about 550° F. and about 1000 p.s.i.g. in all cases.

Following the break-in run the catalyst was used to hydrogenate a naphthenic lube oil of higher viscosity to remove color bodies and increase its stability by reducing its ultraviolet absorption particularly at 260 m$\mu$. The viscosity of the lube treated was about 90 S.U.S. at 210° F. and 2500 at 100° F.

The hydrogenation conditions in each case were: a temperature of about 600° F., a pressure of about 1000 p.s.i.g. using a purchased hydrogen stream of about 100% purity, a fresh feed liquid hourly space velocity of about 0.5 and liquid recycle to provide for a total space velocity of about 4.0.

The sulfiding conditions and the results of the respective hydrogenation were as follows:

| Sulfiding Conditions | Catalyst Number | | | |
|---|---|---|---|---|
| | 1 | 2 | 3 | 4 |
| Pressure, p.s.i.g | 1,250 | 1,250 | 1,000 | 1,250 |
| Make-up H-Purity | 80 | 80 | 100 | 80 |
| Gas Bleed, s.c.f./bbl | 0 | 0 | 350 | 175 |
| Production properties after hydrogenation: | | | | |
| U.V. (260$\mu$) | [1] 3.3 | 3.4 | 3.9 | 3.8 |
| Color (D-1500) | | 0.5 | 0.75 | 0.75 |

[1] Corrected from 2.9 because of a variation in the hydrogenation evaluation.

It can be clearly seen that there is a significant reduction in both the color and the U.V. absorption. This effect has also been confirmed by runs carried out on a much larger scale involving several thousand pounds of catalyst charge. The effect has also been obtained with other petroleum fractions, and the naphthenic lubes in particular.

Specifically, this same effect was demonstrated on a large scale unit of commercial proportions at similar conditions, where the bleed rate was about 100 s.c.f./bbl. The catalyst sulfided without a bleed effected a 38% greater reduction in U.V. absorptivity, namely of 1.6 as compared to 2.6.

Having now described the invention, certain ramifications and modified embodiments will readily occur to those skilled in the art.

What is claimed is:

1. A process of preparing highly active sulfactive hydrogenation catalysts in a high pressure system maintained at a pressure of at least about 500 p.s.i.g. which processs comprises charging hydrogen and carbon disulfide dissolved in a carrier oil to a metal catalyst stock wherein said metal is selected from Group VI or VIII of the periodic table or mixtures thereof, under a pressure of at least about 500 p.s.i.g. and a temperature in the range of about 350° to 550° F., said process being further characterized as being without a gas bleed in the system which is maintained at a pressure of at least about 500 p.s.i.g. and said hydrogen being added only in sufficient amounts to maintain pressure in said high pressure system.

2. A process according to claim 1 said catalyst stock metal is selected from the group consisting of nickel, cobalt, molybdenum and mixtures thereof.

3. A process according to claim 2 wherein said carbon disulfide is present in about 0.2 to 2 volume percent based on the carrier oil.

4. A process according to claim 3 wherein the pressure is in a range of about 500 to 1500 p.s.i.g.

5. A process according to claim 4 wherein the carbon disulfide dissolved in carrier oil are charged to provide for a liquid hourly space rate of about 0.25 to 6.

6. A process according to claim 5 wherein said temperature is in the range of about 400° to 475° F.

7. A process according to claim 6 wherein the catalyst metal is a combination of nickel and molybdenum.

8. A process according to claim 7 wherein the carbon disulfide concentration in the carrier oil is in the range of about 0.5 to 1.0% and the liquid hourly space rate is in the range of about 0.5 to 3.0.

9. A process according to claim 8 wherein the catalyst metal stock of nickel and molybdenum are a combination of about 3% nickel oxide and about 10 to 15% molybdenum oxide.

10. A process according to claim 9 wherein said catalyst so prepared is employed to hydrogenate a naphthenic lube oil at a temperature in the range of about 575° to 625° F. and a pressure of about 500 to 4000 p.s.i.g. at a liquid hourly space rate in the range of about 0.1 to 5.0 and wherein liquid recycle is employed in said hydrogenation process whereby enhanced reduced U.V. absorptivity of said naphthenic lube oil is obtained.

References Cited

UNITED STATES PATENTS

| | | | |
|---|---|---|---|
| 3,160,579 | 12/1964 | Fear | 208—264 |
| 3,287,258 | 11/1966 | Mason | 208—264 |
| 3,313,859 | 4/1967 | Doane | 208—264 |

HERBERT LEVINE, Primary Examiner

U.S. Cl. X.R.

252—439; 208—264